(12) United States Patent
Holmes

(10) Patent No.: US 7,463,260 B1
(45) Date of Patent: Dec. 9, 2008

(54) HANDHELD GRAPHICS TEXT PROCESSING SYSTEM AND METHOD

(75) Inventor: Stephen G. Holmes, Seattle, WA (US)

(73) Assignee: Nvidia Corporation, Santa Clara, CA (US)

( * ) Notice: Subject to any disclaimer, the term of this patent is extended or adjusted under 35 U.S.C. 154(b) by 40 days.

(21) Appl. No.: 11/005,763

(22) Filed: Dec. 6, 2004

(51) Int. Cl.
*G06T 15/00* (2006.01)

(52) U.S. Cl. .................. 345/427; 382/113; 705/26; 705/30

(58) Field of Classification Search .............. 345/427; 382/113; 705/26, 30
See application file for complete search history.

(56) References Cited

U.S. PATENT DOCUMENTS 5,761,328 A * 6/1998 Solberg et al. ............. 382/113

7,069,240 B2 * 6/2006 Spero et al. ................ 705/30

* cited by examiner

*Primary Examiner*—Phu K Nguyen

(57) ABSTRACT

Information associated with representation of textual information can be captured, stored and manipulated in a convenient and efficient automated manner that conserves resources. A handheld text image processing device can include a camera, a graphics processing component, a text processing component and a memory. The camera captures digital picture information associated with text on an object. The graphics processing component performs graphics processing on the digital picture information that facilitate text recognition (e.g., transforms, rotations, etc.). The text processing component recognizes representations of the text in the digital picture information and converts the digital picture information associated with the text into a text file format. The memory stores the information in a text file format. The text file format can represent the textual information utilizing less bits than a file format in which the text information is captured. The text information can also be communicated in a text file format.

25 Claims, 3 Drawing Sheets

200

```
┌─────────────────────────────┐
│  CAPTURING A DIGITAL IMAGE  │
│                         210 │
└─────────────────────────────┘
               │
┌─────────────────────────────┐
│ PERFORMING GRAPHICS PROCESSING │
│ ON THE DIGITAL IMAGE        │
│                         220 │
└─────────────────────────────┘
               │
┌─────────────────────────────┐
│ IDENTIFYING TEXT IN THE DIGITAL │
│ IMAGE                       │
│                         230 │
└─────────────────────────────┘
               │
┌─────────────────────────────┐
│ STORING TEXT INFORMATION IN A │
│ TEXT FILE FORMAT            │
│                         240 │
└─────────────────────────────┘
```

FIG. 2

HANDHELD GRAPHICS TEXT PROCESSING SYSTEM AND METHOD

FIELD OF THE INVENTION

The present invention relates to the field of text recognition and processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. A number of different types of electronic systems often utilize textual information in the realization of these results. However, the generation, manipulation, retention and conveyance of textual information can be complicated and resource intensive.

Conventional textual information generation operations usually involve considerable manual input intervention. For example, traditional systems often require a user to manually type the information on a keyboard. Conventional attempts at automating textual information input usually involve proximity and object limitations. For example, traditional scanning attempts usually require the object to be a document that is flatly pressed directly against a transparent surface such as a piece of glass and closed in a dark environment under a cover with no ambient light. However, textual information can be originally printed or transcribed on a variety of mediums (such as whiteboards, advertisement bill boards, three dimension objects such as a box, block, ball, cylinder, etc.) that cannot be conveniently placed within the requisite direct contact with a scanner and in closed ambient lighting conditions. Establishing contrast boundaries can also be difficult for three dimensional text such as text on a curved surface, as the boundaries of text lines tend to bend and distort with the curved surface.

Traditional attempts at automating textual information input are also typically resource intensive. For example, a number of traditional attempts involving scanners require dedicated capture hardware and complex dedicated character recognition software. Some formats of storing information are resource intensive. For example, images in a bitmap format associated with picture elements (e.g., pixels) utilized in digital photography typically include a significant number bits to represent the pixels. Some digital cameras are able to save the image data straight from a CCD in an uncompressed file format (e.g., CCD RAW). Other conventional storage formats include tagged image file format (TIFF), graphic interchange format (GIF), or joint photographic experts group (JPEG) format. These formats typically save a significant amount of extraneous information that is minimally useful for text processing purposes, such as background image information not directly associated with the text, the color of the text, etc. These conventional storage formats also typically consume significant communication resources since the number of bits associated with the extraneous image information can be relatively large.

A number of different types of electronic systems are utilized in the generation, manipulation, retention and conveyance of textual information. A number of new categories of devices (e.g., such as portable game consoles, portable wireless communication devices, portable computer systems, etc.) are small enough to be held in the hands of a user making them very convenient. Handheld devices are becoming increasingly important as the underlying fundamental potential of various activities (e.g., communications, game applications, internet applications, etc.) are increasing. However, the resources (e.g., processing capability, storage resources, etc.) of handheld devices and systems are usually relatively limited. For example, the convenient portable nature of handheld devices often limits onboard processing and storage resources as well as communication abilities.

Limitations of hand held devices can make capturing, coordinating and manipulating information associated with a text very difficult or even impossible in a handheld device. Traditional interfacing with a system involving manual entry of textual information by a user can be difficult in situations where a user is supporting the device in one hand and can detract from the convenience. Even though handheld devices are portable, placing an object (e.g., a whiteboard, chalkboard, billboard, overhead projection, etc.) in close enough proximity to a handheld device for conventional scanning type devices can be difficult. Conventional scanning techniques also typically require special dedicate scanning hardware that often detracts from the portability and/or convenience of a handheld device. Storing and communicating textual information in a number of conventional image storage formats that involve a significant number of bits (e.g., bitmap, TIFF, etc.) can be particularly taxing on the relatively limited storage and communication resources of a handheld device.

SUMMARY

Embodiments of the present invention handheld text image processing system and method provide convenient and efficient textual information processing, storage and communication. Information associated with representation of textual information can be captured, stored and manipulated in an automated manner that conserves resources of a hand held device. The present invention can facilitate hand held device size reduction by leveraged utilization of components in text recognition operations.

In one embodiment, a present invention handheld text image processing device includes a camera, a graphics processing component, a text processing component and a memory. The camera captures digital picture information associated with text on an object. The graphics processing component performs graphics processing on the digital picture information that facilitate text recognition (e.g., transforms, rotations, etc.). The text processing component recognizes representations of the text in the digital picture information and converts the digital picture information associated with the text into a text file format. The memory stores the information in a text file format. In one embodiment of the present invention, the text file format represents the textual information utilizing less bits than a file format in which the text information is captured. The text information can also be communicated in a text file format (e.g., encapsulated in a communication protocol format).

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is a flow chart of handheld text image processing method 200 in accordance with one embodiment of the present invention.

DETAILED DESCRIPTION

Figure 1:
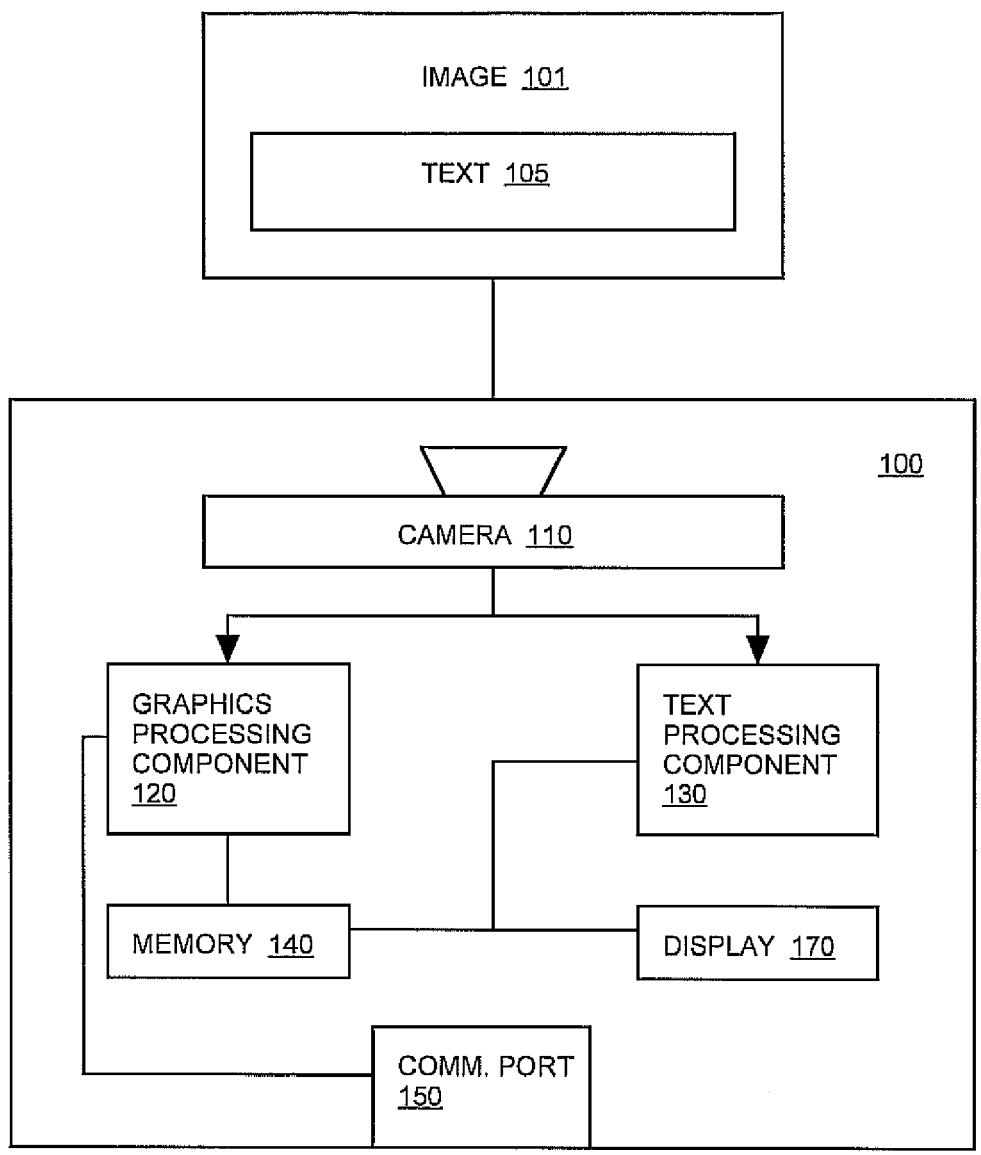
FIG. 1 is a block diagram of a handheld text image processing device in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

The present invention facilitates efficient and convenient capture, storage and communication of text information. In one embodiment of the present invention, handheld text image processing devices and methods enable leverage utilization of hardware components for textual processing, storage and communication activities as well as a variety of other activities. For example, embodiments of a present invention handheld text image processing device can utilize camera features to capture textual information as well as take pictures of various other types of images. Images of text captured by utilizing a camera in accordance with embodiments of the present invention, can be stored as textual information in a manner that conserves storage and communication resources. Leveraged utilization of processing components (e.g., a central processor, graphics processor, etc.) of present invention embodiments can be utilized to facilitate activities involving text information (e.g., text recognition, storage, communication, etc.) as well as participate in a variety of other activities (e.g., video games, movie presentations, etc.).

FIG. 1 is a block diagram of handheld text image processing device 100 in accordance with one embodiment of the present invention. Handheld text image processing device 100 includes camera 110, graphics processing component 120, text processing component 130, memory 140, display 170 and network communications component 150. Camera 110 is communicatively coupled to graphics processing component 120 and text processing component 130 which are communicatively coupled to memory 140. Memory 140 is communicatively coupled to display 170 and network communications component 150.

The components of handheld text image processing device 100 cooperatively operate to perform text processing operations. Camera 110 captures digital picture information associated with an image (e.g., image 101) including text (e.g., text 105). Graphics processing component 120 performs graphics processing on the digital picture information, including manipulations to facilitate text recognition. Text processing component 130 recognizes representations of the text in the digital picture information and converts the digital picture information associated with the text into a text file format. Memory 140 stores the text file format information. Display interface 170 displays the text file format information for viewing and editing. Network communications component 150 communicates with a network (not shown).

In one embodiment of the present invention, graphics processing component 120 and text processing component 130 are included in processors. For example, graphics processing component 120 is a graphics processor and text processing component 130 is a central processing unit. The graphics processing component 120 performs graphics processing operations that facilitate text recognition and the central processing component performs text recognition and editing operations. It is appreciated that the present invention is readily adaptable to a variety of configurations. For example, graphics processing component 120 and text processing component 130 can be included in a single processor.

Graphics processing component 120 performs a variety of graphics processing operations including manipulation of the digital picture information to make it easier for the text processing component 130 to recognize textual characters. For example, graphics processing component 120 can transform information captured from a three dimensional image (e.g., text on a curved surface) into two dimensional information representation that assists text processing component 130 in text recognition operations. Graphics processing component 120 can also perform rotation transformations that manipulate the picture information data to facilitate text recognition. In one exemplary implementation, graphics processing component 120 performs contrast transformations and focus refining manipulations that help distinguish edges of text in an image from other aspects of the image (e.g., background).

Text processing component 130 performs a variety of operations associated with text recognition, storage and communication. In one embodiment of the present invention, text processing component 130 performs character recognition operations. Text processing component 130 can implement character recognition based upon a number of recognition approaches. For example, text processing component 130 can utilize an averaging process to determine text image shapes and match the shapes to a corresponding character letter or number. In one exemplary implementation, a database of stored bitmap representations of a character are compared to captured bitmap representations and matches indicate the character identification. A present invention text processing component 130 can also perform feature extraction techniques that identify characters by utilizing rules that define universal features of a character (e.g., the way curves and lines of a particular letter join together). For example, the letter "b" can be defined as a pattern with a loop at the bottom and a straight line on the left side.

FIG. 2 is a flow chart of handheld text image processing method 200 in accordance with one embodiment of the present invention.

In step 210, a digital image is captured. In one embodiment of the present invention, the digital image is a digital picture captured with a camera. The digital picture can be a still picture or a video. The cameras can capture an image as data straight from a CCD in an uncompressed file format (e.g., CCD RAW). Embodiments of the present invention, can store information captured by the camera in a variety of formats including tagged image file format (TIFF), graphic interchange format (GIF), or joint photographic experts group (JPEG) format.

In step 220, graphics processing is performed on the digital image. In one embodiment of the present invention, the digital image information is processed through a graphics pipeline. For example, the graphics processing includes performing geometrical transformation processing on the digital image information. The geometrical transformation processing can include image rotation operations. The graphics processing can also include contrast enhancement operations in which gradual or shady contrasts are refined and made more precise, (e.g., focus sharpening operations can be performed on the image information). The graphics processing can include three dimensional conversion operations in which three dimensional to two dimensional conversion operations are performed on the information.

In step 230, text in the digital image is identified. In one embodiment of the present invention, character recognition operations are performed. For example, pattern matching and/or feature extraction techniques are performed. In one exemplary implementation, intelligent character recognition features are implemented. For example, contextual analysis and/or predictive optical word recognition (POWR) algorithms can be utilized to identify characters. Embodiments of the present invention can utilize a variety of different artificial intelligence or "expert" algorithms and data to perform character recognition analysis including, predictive modeling techniques, probability analysis, and hypotheses generation and testing in interpreting the captured information.

In step 240, the text information is stored in a text file format. In one embodiment of the present invention, the text is stored in an ASCI text format. Textual information can also be stored in formats compatible with a variety of applications (e.g., word processors, spread sheets, web pages, etc.). In one exemplary implementation, the text format does not include extraneous information (e.g., color, background, etc.) beyond identification of the character.

A number of operations can be performed on the information stored in a text file format. For example, the text information can be altered in response to editing commands. The text information can be utilized in a variety of applications (e.g., word processing applications, spreadsheet applications, web page applications, etc.). The text information can also be forwarded to other devices, for example via a network connection. It is appreciated that the text information can be forwarded to a variety of network connections (e.g., ISDN, cable modem, wireless, optical, etc.). It is also appreciated that the text information can be encapsulated in a variety of network communication formats. For example, the text information can be encapsulated in a variety of communication format and/or network header information. In one embodiment of the present invention, the text information can be compressed and/or encrypted for communication.

Figure 3:
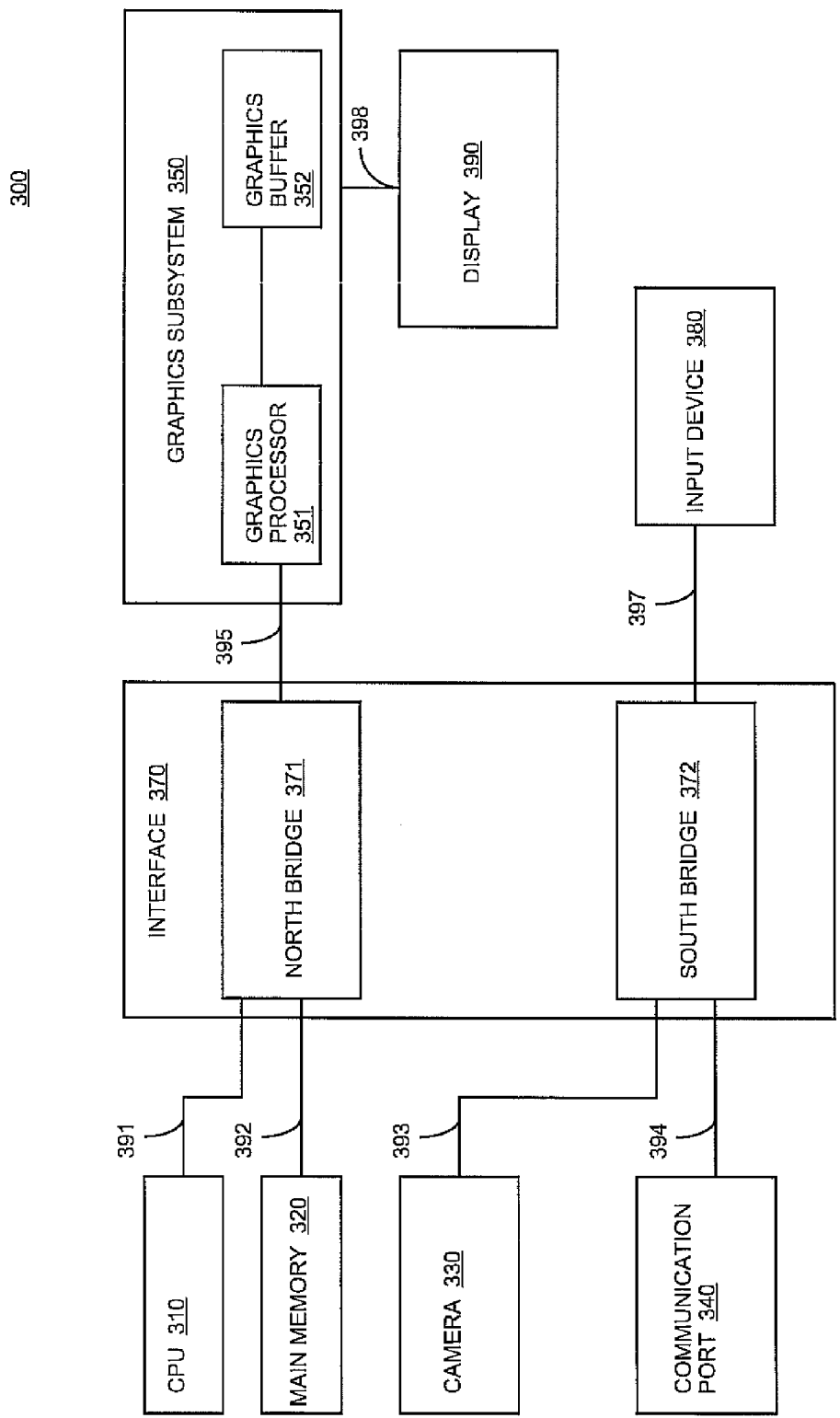
FIG. 3 is a block diagram of an exemplary computer system upon which embodiments of the present invention can be implemented.

FIG. 3 is a block diagram of a computer system 300, one embodiment of a computer system upon which embodiments of the present invention can be implemented. Computer system 300 includes central processor unit 310, main memory 320 (e.g., random access memory), interface 370, camera 330, input device 380, signal communications port 340, and graphics subsystem 350 which is coupled to display 390. Computer system 300 includes several busses 391 through 398 for communicatively coupling the components of computer system 300. In one embodiment interface 370 includes a north bridge 371 and south bridge 372 and graphics subsystem 350 includes graphics processor 351 and graphics buffer 352.

The components of computer system 300 cooperatively operate to provide versatile functionality and performance for text processing operations. Communications buses 391 through 398 communicate information. Central processor 391 performs information processing including text recognition operations. Main memory 392 stores information and instructions for the central processor 391 and graphics processor 351. Camera 330 captures digital picture information, including information corresponding to text on an object. Input device 397 provides a mechanism for inputting information and/or for pointing to or highlighting information on display 390. Signal communication port 340 provides a communication interface to exterior devices (e.g., an interface with a network). Display device 390 displays information. Graphics subsystem 350 performs graphics processing operations including operations to facilitate text recognition. For example, graphics processing system 350 can perform graphics transform operations on information captured by camera 330 and provide the results to central processor 391 for text recognition operations.

It is appreciated that the present invention can be implemented in a variety of embodiments. In one exemplary implementation the present invention can be utilized in processing systems to provide a variety of graphics applications including text recognition, processing and communication. For example, the present invention can be utilized to perform text processing in a personal computer, personal digital assistant, cell phone, handheld device or any number of platforms for implementing text processing. It is also appreciated that references to handheld implementations are exemplary and the present invention is not limited to these implementations.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. In the claims, the order of elements does not imply any particular order of operations, steps, or the like, unless a particular element makes specific reference to another element as becoming before or after.

What is claimed is:

1. A handheld text image processing device:
   a camera for capturing digital picture information associated with text on an object;
   a graphics processing component for performing graphics processing on said digital picture information in a graphics pipeline;
   a text processing component for recognizing representations of said text in said digital picture information and converting said digital picture information associated with said text into a text file format; and
   a memory for storing said information in a text file format, wherein said storing of said information in said text file format facilitates conservation of said text as captured by said camera.

2. A handheld text image processing device of claim 1 wherein said graphics processing component transforms information captured from a three dimensional image into two dimensional information representation that assists said text processing component in text recognition operations.

3. A handheld text image processing device of claim 1 wherein said graphics processing component performs rotation transformations in said graphics pipeline.

4. A handheld text image processing device of claim 1 wherein said graphics processing component performs contrast transformations in said graphics pipeline.

5. A handheld text image processing device of claim 1 wherein said graphics processing component is a graphics processor.

6. A handheld text image processing device of claim 1 further comprising a display interface for displaying and editing said text format information.

7. A handheld text image processing device of claim 1 further comprising a network communication component for communicating with a network, wherein said converting said digital picture information associated with said text into a text file format that conserves storage and communication resources.

8. A handheld text image processing method comprising:
   capturing a digital image;
   performing graphics processing on said digital image in a graphics pipeline;
   identifying text in said digital image; and
   storing said text in a text file format, wherein said storing of said text in said text file format facilitates conservation of said text as presented in said digital image and conservation of storage resources.

9. A handheld text image processing method of claim 8 wherein said graphics processing comprises performing geometrical transformation processing on said digital image information.

10. A handheld text image processing method of claim 8 wherein said graphics processing includes three dimensional conversion operations in which three dimensional to two dimensional conversion operations are performed on the information.

11. A handheld text image processing method of claim 8 wherein said graphics processing comprises rotation operations.

12. A handheld text image processing method of claim 8 wherein said graphics processing comprises contrast enhancement operations.

13. A handheld text image processing method of claim 8 wherein said graphics processing comprises focus sharpening operations.

14. A handheld text image processing method of claim 8 further comprising forwarding said text information on a network connection, wherein digital information associated with said text is in a text file format that conserves storage and communication resources.

15. A handheld text image processing method of claim 8 further comprising altering said text information of said digital image in response to editing commands.

16. A handheld text image processing method of claim 8 where in a camera can capture an image as data straight from a CCD in an uncompressed file format.

17. A graphics text processing system comprising
   a bus for communicating information;
   a camera for capturing digital information associated with an image including text;
   a processor for performing graphics processing in a graphics pipeline including converting digital picture format information into text format information; and
   a memory for storing text format information, wherein said storing of said information in said text format facilitates conservation of said digital information as captured by said camera.

18. A graphics text processing system of claim 17 wherein said camera is a video camera.

19. A graphics text processing system of claim 17 further comprising network communication interface for communicating information, wherein said converting said digital picture format information associated with said text into a text file format that conserves storage and communication resources.

20. A graphics text processing system of claim 17 further comprising a graphics processor for performing graphics transform operations on information captured by said camera, wherein said graphics transform operation results facilitate text recognition operations.

21. A computer readable medium for storing instructions for directing a processor to perform a handheld text image processing method comprising:
   receiving digital image information captured by a camera;
   executing graphics processing on said digital image graphics pipeline;
   recognizing text in said digital image; and
   saving said text in a text file format, wherein said saving of said text in said text file format facilitates conservation of said digital information as captured by said camera.

22. A computer readable medium of claim 21 wherein said instructions include geometrical transformation directions for manipulating said digital image information in said graphics pipeline.

23. A computer readable medium of claim 21 wherein said instructions include three dimensional conversion directions for converting three dimensional information into two dimensional projection information that defines text boundaries with enhanced two dimensional edge corrections and definitions.

24. A computer readable medium of claim 21 wherein said computer readable medium is included in a handheld device.

25. A computer readable medium of claim 21 wherein said computer readable medium is included in a portable telephone.

* * * * *